(12) United States Patent
Hara

(10) Patent No.: US 8,587,702 B2
(45) Date of Patent: Nov. 19, 2013

(54) IMAGE PROCESSING APPARATUS, IMAGE PICKUP APPARATUS, IMAGE PROCESSING METHOD, AND PROGRAM

(75) Inventor: Kazunari Hara, Tokyo (JP)

(73) Assignee: Sony Corporation, Tokyo (JP)

( * ) Notice: Subject to any disclaimer, the term of this patent is extended or adjusted under 35 U.S.C. 154(b) by 91 days.

(21) Appl. No.: 13/335,173

(22) Filed: Dec. 22, 2011

(65) Prior Publication Data

US 2012/0176520 A1    Jul. 12, 2012

(30) Foreign Application Priority Data

Jan. 11, 2011    (JP) ................. 2011-002666

(51) Int. Cl.
*H04N 9/64*    (2006.01)

(52) U.S. Cl.
USPC .......................................... 348/246; 348/345

(58) Field of Classification Search
None
See application file for complete search history.

(56) References Cited

U.S. PATENT DOCUMENTS

| | | | |
|---|---|---|---|
| 8,018,524 B2 * | 9/2011 | Kawarada ................ | 348/350 |
| 2010/0091161 A1 * | 4/2010 | Suzuki ..................... | 348/302 |
| 2010/0245631 A1 * | 9/2010 | Hoda et al. ............... | 348/241 |
| 2012/0176532 A1 * | 7/2012 | Hara ........................ | 348/352 |
| 2012/0224087 A1 * | 9/2012 | Hoda et al. ............... | 348/247 |
| 2012/0320241 A1 * | 12/2012 | Sugawara ................ | 348/246 |

FOREIGN PATENT DOCUMENTS

JP    2009-145401    7/2009

OTHER PUBLICATIONS

U.S. Appl. No. 13/337,752, filed Dec. 27, 2011, Hara.

* cited by examiner

*Primary Examiner* — James M Hannett
*Assistant Examiner* — Wesley J Chiu
(74) *Attorney, Agent, or Firm* — Sony Corporation

(57) ABSTRACT

An image processing apparatus includes: an image pickup device with image creating pixels for creating images and pairs of phase difference detection pixels of two types for creating pixel values for in-focus state judgment; a detection unit detecting the edge of a first figure formed by the pixel values of the image creating pixels and the edge of a second figure formed by the pixel values of the pairs of phase difference detection image pixels; and a compensation unit that, if a defective pixel is included in phase difference detection pixels of one type, calculates a distance between the second figure regarding phase difference detection pixels of the other type and the first figure on the basis of the detected edges, and compensates for the pixel value of the defective pixel on the basis of the calculated distance and the pixel values of phase difference detection pixels of another type.

10 Claims, 9 Drawing Sheets

FIG. 2
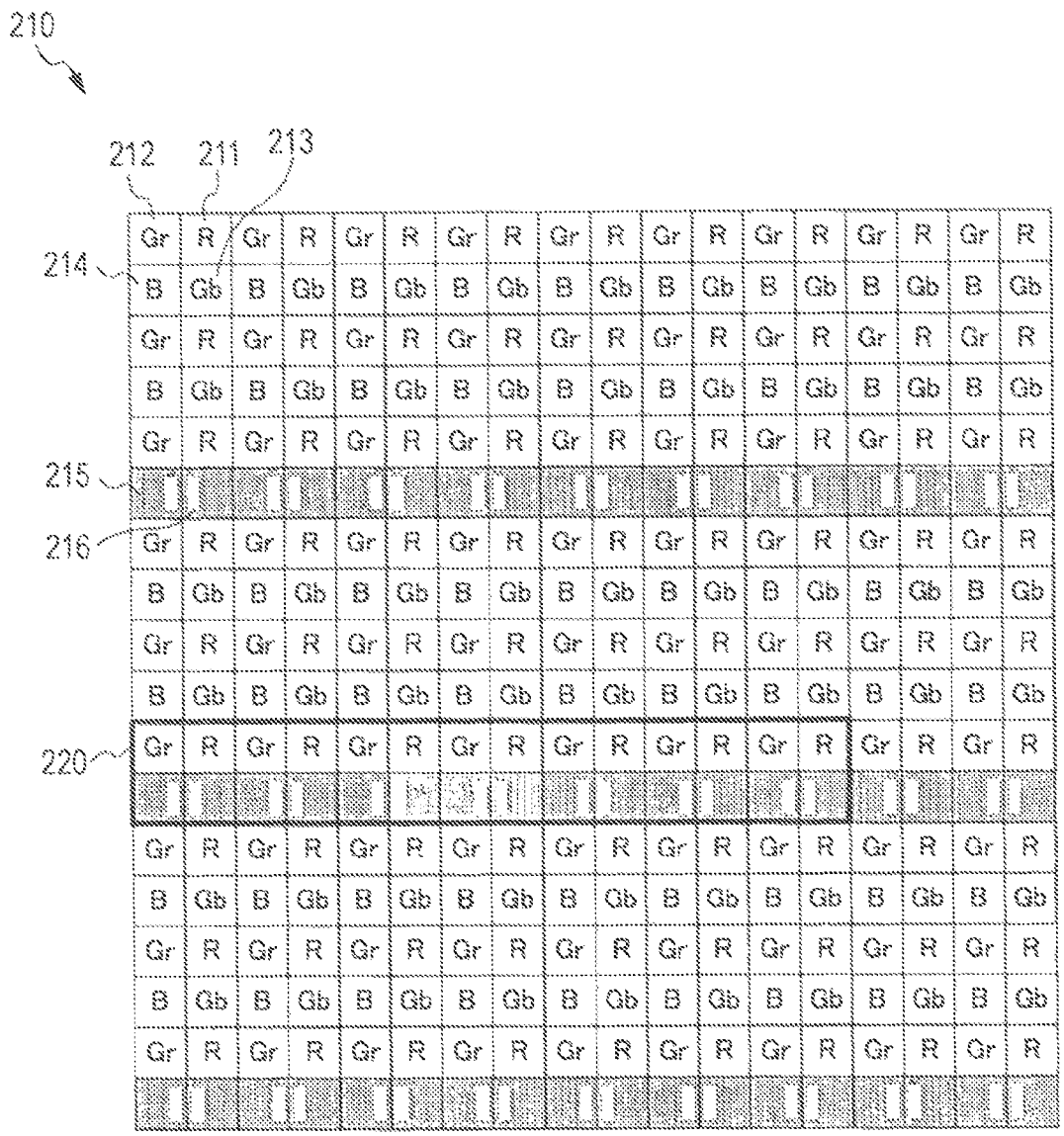
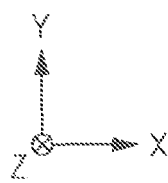

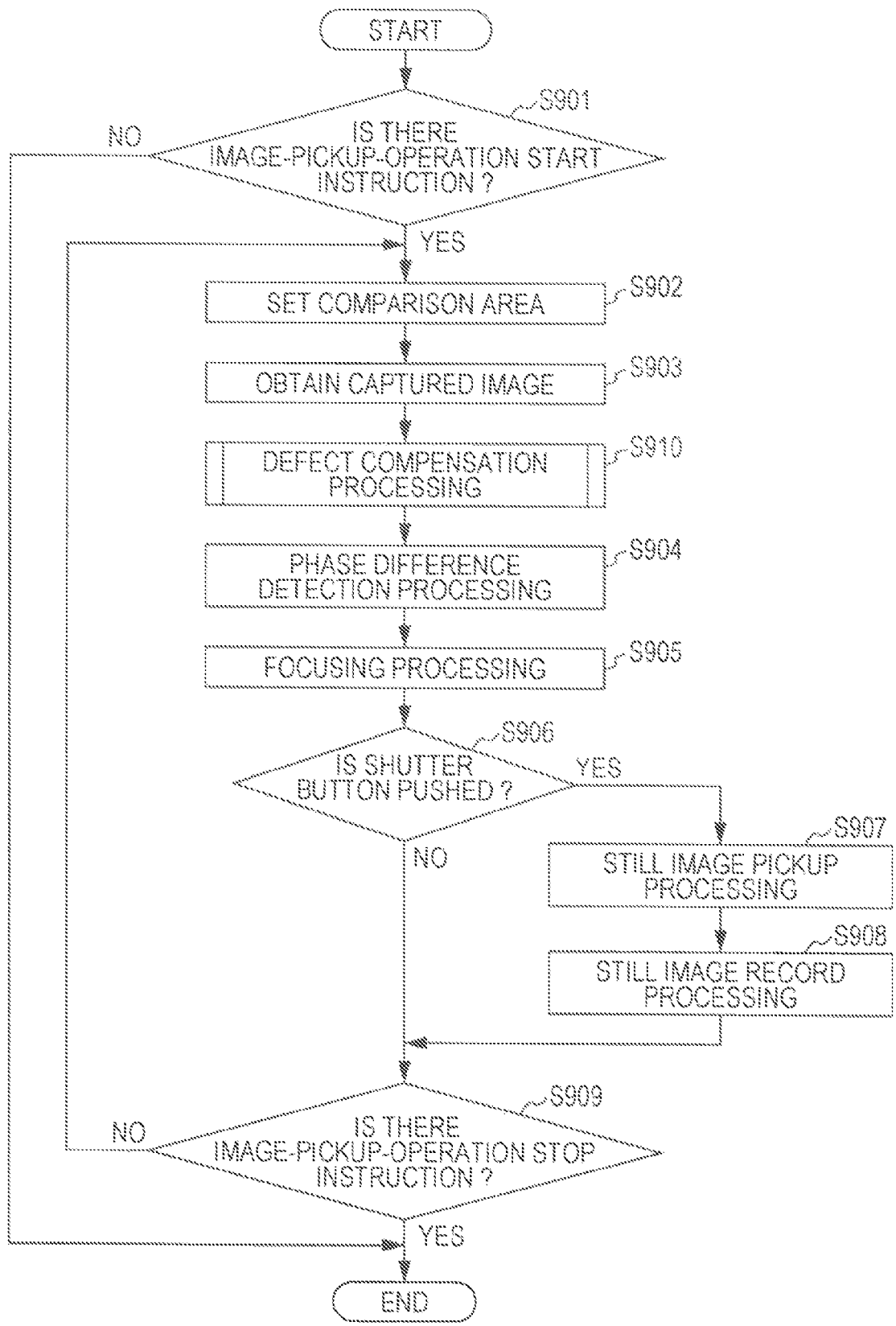

IMAGE PROCESSING APPARATUS, IMAGE PICKUP APPARATUS, IMAGE PROCESSING METHOD, AND PROGRAM

BACKGROUND

The present disclosure relates to image processing apparatuses, and in particular, to an image processing apparatus and an image processing method in which the values of pixels are compensated for, and a program that makes a computer execute the above method.

In recent years, the use of image pickup devices that create captured images by taking images of objects such as human figures and recording these created images, such as digital still cameras, has become widespread. One of these image pickup devices that has become widely used is an image pickup device that has an acceptance surface including pixels on which color filters are disposed in a Bayer array.

In addition, recently, with the advent of multifunction image pickup apparatuses and high quality image pickup apparatuses, image pickup devices having pixels other than ones for creating images, or image pickup devices having color filters other than R, G, and B color filters disposed in a Bayer array have been researched. For example, an image pickup device that is equipped with both pixels for creating images (image creating pixels) and new pixels for realizing plural functions is now being researched.

For example, an image pickup apparatus that is equipped with pickup devices having pixels for pupil-dividing light passing through an image pickup lens (phase difference detection pixels) is proposed as an image pickup apparatus equipped with one of these image pickup devices (Refer to Japanese Unexamined Patent Application Publication No. 2009-145401, for example). In this image pickup apparatus, phase difference detection pixels that perform pupil-division by blocking half of the light emitted from an object that light-sensitive elements receive are installed, and owing to the operation of these phase difference detection pixels, a pair of figures is formed. By measuring an interval between two images, an out-of-focus distance can be calculated. This image pickup apparatus calculates the moving distance of its image pickup lens on the basis of the out-of-focus distance, and performs focus control by adjusting the position of the image pickup lens on the basis of the calculated moving distance.

SUMMARY

In the above-described related technology, because an image pickup apparatus is equipped with an image pickup device having both phase difference detection pixels and image creation pixels, it is not necessary that the image pickup apparatus be separately equipped with an image pickup device for focus detection and an image pickup device for image pickup.

In addition, in the above-described related technology, if there is a defective pixel among phase difference detection pixels, the pixel value of the defective pixel can be compensated for with the use of the average value of the pixel values of the phase difference detection pixels that are adjacent to the defective pixel and receive pupil-divided light whose direction is the same as that of light the defective pixel would receive. However, it is conceivable that there is a defective pixel at the edge of a high frequency image, or there is an area where defective pixels are densely existing. In such a case as this, because it is difficult that a proper compensation is performed owing to high frequency components of the image or effects of the densely existing defective pixels, the accuracy of the compensation may be deteriorated. However, it is important that, even in such a case, an accurate compensation is performed on the defective pixel(s) among the phase difference detection pixels.

The present disclosure is achieved with the above-described problems borne in mind, and can improve the accuracy of the compensation of the value of a defective pixel belonging to phase difference detection pixels.

The present disclosure is achieved to resolve the above-described problems, and a first embodiment of the present disclosure provides an image processing apparatus that includes: an image pickup device that is equipped with a plurality of image creating pixels that create pixel values for creating images and equipped with a plurality of two types of pairs of phase difference detection pixels that create pixel values for making an in-focus state judgment through phase difference detection; a detection unit that detects the edge of a first figure formed by the pixel values of the image creating pixels among pixel values included in image data created by the image pickup device, and detects the edge of a second figure formed by the pixel values of the two types of phase difference detection image pixels among the pixel values included in the image data created by the image pickup device; and a compensation unit that, in the case where a defective pixel is included in one type of phase difference detection pixels, calculates a distance between the second figure regarding the other type of phase difference detection pixels and the first figure on the basis of the detected edges, and compensates for the pixel value of the defective pixel on the basis of the calculated distance and the pixel values of the other type of phase difference detection pixels. In addition, the first embodiment of the present disclosure provides an image processing method used for the image processing apparatus, and a program that causes a computer to execute the image processing method. As a result, the first embodiment of the present disclosure brings about an effect that, in the case where a defective pixel is included in one type of phase difference detection pixels, the compensation of the pixel value of the defective pixel can be performed on the basis of the calculated distance between the first figure represented by the pixel values of the other type of the image creating pixels and the second figure regarding phase difference detection pixels and the pixel values of the other type of phase difference detection pixels.

In addition, in this first embodiment of the present disclosure, the compensation of the pixel value of the defective pixel can be performed in such a way that the detection unit sets a certain area used for detecting the distance and detects an edge represented by the pixel values of the other type of phase difference detection pixels within the certain area and an edge represented by the pixel values of the image creating pixels adjacent to the certain area, and the compensation unit calculates a distance between the edge represented by the pixel values of the other type of phase difference detection pixels and the edge represented by the pixel values of the image creating pixels and compensates for the pixel value of the defective pixel on the basis of the calculated distance and the pixel values of the other type of phase difference detection pixels. As a result, the first embodiment of the present disclosure also brings about an effect that the compensation of the pixel value of the defective pixel that is disposed in the certain area used for detecting the distance can be performed.

In addition, in this embodiment of the present disclosure, if the position of the defective pixel and the position of the edge represented by the pixel values of the other type of phase difference detection pixels are situated symmetrically with respect to the position of the edge represented by the pixel values of the image creating pixels, the compensation unit can compensate for the pixel value of the defective pixel on the basis of the pixel value regarding the edge represented by the pixel values of the other type of phase difference detection pixels. As a result, the first embodiment of the present disclosure also brings about an effect that the compensation of the pixel value of the defective pixel can be performed on the basis the pixel values regarding the edge represented by the pixel values of the other type of phase difference detection pixels if the position of the defective pixel and the position of the edge represented by the pixel values of the other type of phase difference detection pixels are situated symmetrically with respect to the position of the edge represented by the pixel values of the image creating pixels.

In addition, in this embodiment of the present disclosure, if the position of the defective pixel and the position of the edge represented by the pixel values of the other type of phase difference detection pixels are not situated symmetrically, the compensation unit compensates for the pixel value of the defective pixel on the basis of the average value of the pixel values of the one type of phase difference detection pixels adjacent to the defective pixel. As a result, the first embodiment of the present disclosure also brings about an effect that the compensation of the pixel value of the defective pixel can be performed on the basis of the average value of the pixel values of the one type of phase difference detection pixels adjacent to the defective pixel if the position of the defective pixel and the position of the edge represented by the pixel values of the other type of phase difference detection pixels are not situated symmetrically.

In addition, in this embodiment of the present disclosure, if the edge represented by the pixel values of the other type of phase difference detection pixels that corresponds to the detected edge represented by the pixel values of the image creating pixels is not detected in the certain area, the compensation unit can compensate for the pixel value of the defective pixel on the basis of the average value of the pixel values of the one type of phase difference detection pixels adjacent to the defective pixel. As a result, the first embodiment of the present disclosure also brings about an effect that the compensation of the pixel value of the defective pixel can be performed on the basis of the average value of the pixel values of the one type of phase difference detection pixels adjacent to the defective pixel if the edge represented by the pixel values of the other type of phase difference detection pixels that corresponds to the detected edge represented by the pixel values of the image creating pixels is not detected in the certain area.

In addition, in this embodiment of the present disclosure, it is conceivable that, while the image creating pixels includes: red pixels covered with red filters that block lights belonging to wavelength ranges other than the wavelength range of red light; blue pixels covered with blue filters that block lights belonging to wavelength ranges other than the wavelength range of blue light; and green pixels covered with green filters that block lights belonging to wavelength ranges other than the wavelength range of green light, and the edge represented by the pixel values of the image creating pixels is an edge of a figure formed by the pixel values of the green pixels, the compensation unit calculates a distance between the edge represented by the pixel values of the other type of phase difference detection pixels and the edge represented by the pixel values of the green pixels, and compensates for the pixel value of the defective pixel on the basis of the calculated distance and the pixel values of the other type of phase difference detection pixels. As a result, the first embodiment of the present disclosure also brings about an effect that the distance between the edge represented by the pixel values of the other type of phase difference detection pixels and the edge represented by the pixel values of the green pixels is calculated and the compensation of the pixel value of the defective pixel can be performed on the basis of the calculated distance and the pixel values of the other type of phase difference detection pixels.

A second embodiment of the present disclosure provides an image pickup apparatus that includes: an image pickup device equipped with plural image creating pixels that create pixel values for creating images and equipped with plural pairs of two types of phase difference detection pixels that create pixel values for making an in-focus state judgment through phase difference detection; a detection unit that detects the edge of a first figure formed by the pixel values of the image creating pixels among pixel values included in image data created by the image pickup device, and detects the edge of a second figure formed by the pixel values of the two types of phase difference detection image pixels among the pixel values included in the image data created by the image pickup device; a compensation unit that, in the case where a defective pixel is included in one type of phase difference detection pixels, calculates a distance between the second figure regarding the other type of phase difference detection pixels and the first figure, and compensates for the pixel value of the defective pixel on the basis of the calculated distance and the pixel values of the other type of phase difference detection pixels; a judgment unit that judges whether a focus-target object is actually brought into focus or not on the basis of the compensated pixel values of the phase difference detection pixels; and a control unit that controls the drive of a lens on the basis of the judgment result made by the judgment unit. As a result, the second embodiment of the present disclosure brings about an effect that, in the case where a defective pixel is included in one type of phase difference detection pixels, the compensation of the pixel value of the defective pixel can be performed on the basis of the distance between the first figure represented by the pixel values of the image creating pixels and the second figure regarding the other type of phase difference detection pixels and the pixel values of the other type of phase difference detection pixels, and that the in-focus state judgment can be made on the basis of the compensated pixel value of the defective pixel.

According to the embodiments of the present disclosure, an effect that the accuracy of the compensation of the value of a defective pixel belonging to phase difference detection pixels can be improved is brought about.

BRIEF DESCRIPTION OF THE DRAWINGS

FIG. 2 is a schematic diagram showing an example of the array of pixels included in an image pickup device according to the embodiment of the present disclosure;

FIG. 8 is a flowchart showing an example of an image pickup processing procedure for the compensation of a defective pixel of phase difference detection pixels performed by the image pickup apparatus according to the embodiment of the present disclosure.

DETAILED DESCRIPTION OF EMBODIMENTS

An embodiment of the present disclosure (referred to as the embodiment hereinafter) will be described hereinafter.
<First Embodiment>
[Functional Configuration Example of Image Pickup Apparatus]

Figure 1:
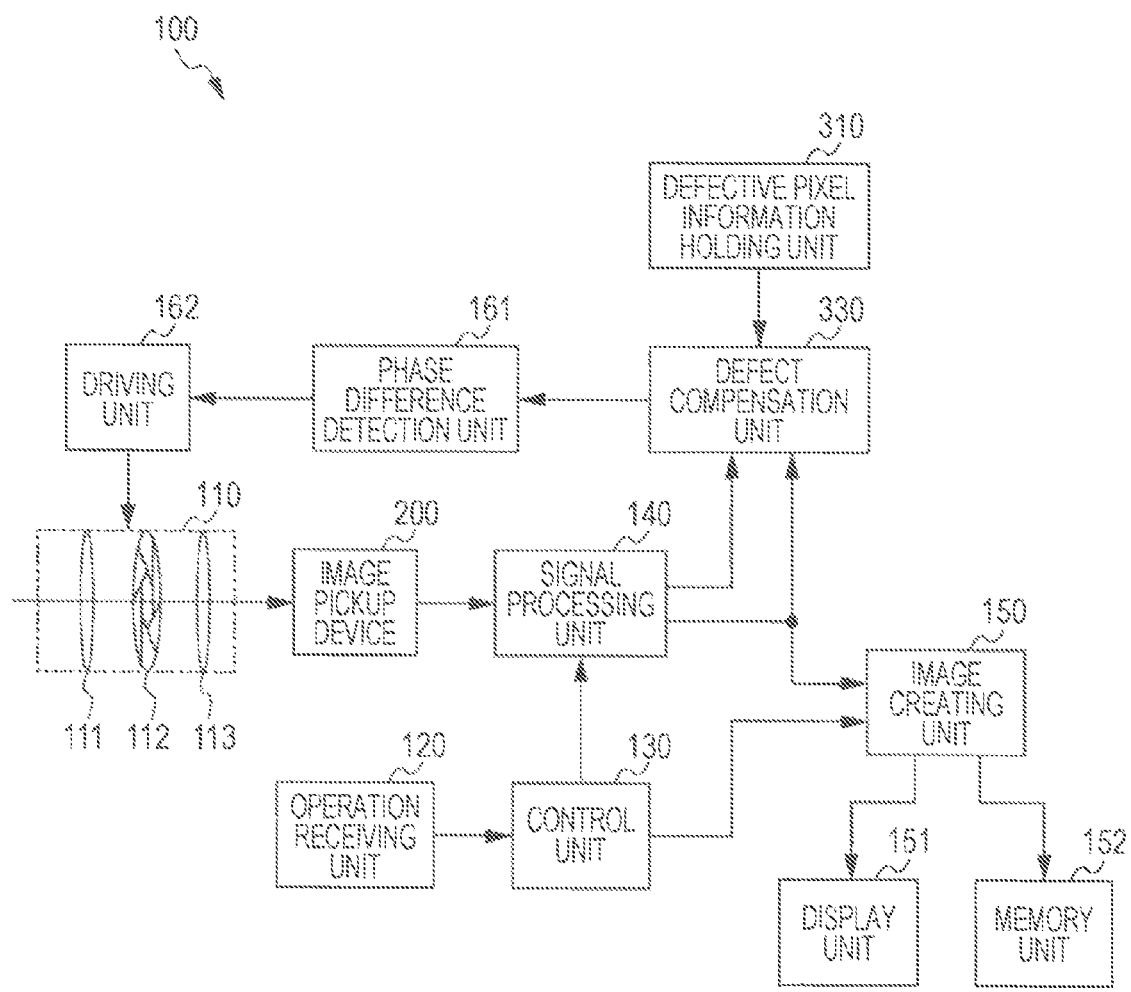
FIG. 1 is a block diagram showing an example of the functional configuration of an image pickup apparatus according to an embodiment of the present disclosure.

FIG. 1 is a block diagram showing an example of the functional configuration of an image pickup apparatus 100 according to an embodiment of the present disclosure. The image pickup apparatus 100 is an image pickup apparatus that creates image data (captured images) by taking images of objects, and records the created image data as image contents (still image contents and moving image contents). It will be assumed that still image contents (still image files) will be mainly recorded as image contents (image files) in the following descriptions.

The image pickup apparatus 100 includes a lens unit 110, an operation receiving unit 120, a control unit 130, an image pickup device 200, a signal processing unit 140, an image creating unit 150, a display unit 151, and a memory unit 152. In addition, the pickup apparatus 100 includes a defective pixel information holding unit 310, a defect compensation unit 330, a phase difference detection unit 161, and a driving unit 162.

The lens unit 110 collects light emitted from an object (object light). This lens unit 110 includes a zoom lens 111, an aperture 112, and a focus lens 113.

Being driven by a driving unit 162, the zoom lens 111 is moved in the direction of an optical axis to change a focal distance so as to adjust the magnification of the image of an object included in a captured image.

The aperture 112 is a blocking means that changes the degree of an opening in accordance with the drive of the driving unit 162, and adjusts the amount of the object light incident on the image pickup device 200.

Being driven by the driving unit 162, the focus lens 113 is moved in the direction of the optical axis in order to perform focal adjustment.

The operation unit 120 receives operations issued by a user. For example, when a shutter button (not shown) is pushed by the user, the operation unit 120 supplies a signal regarding the push of the shutter button to the control unit 130 as an operation signal.

The control unit 130 controls an operation of each unit of the image pickup apparatus 100. In FIG. 1, only main signal lines are depicted, and other lines are omitted. For example, when the shutter button is pushed, and the control unit 130 receives an operation signal to start recording a still image, the control unit 130 supplies this signal to the signal processing unit 140.

The image pickup device 200 is an image sensor that photoelectrically converts the object light it received to electric signals. This image pickup device 200 can be realized with the use of CMOS (complementary metal-oxide semiconductor) sensors or CCD (charge-coupled device) sensors. The image pickup device 200 includes pixels that creates signals for creating captured images on the basis of the received object light (image creation pixels), and pixels that create signals for detecting phase differences (phase difference detection pixels). Here, phase difference detection is a type of focus detection method in which a pair of figures is formed by pupil-dividing light passing through an image pickup lens, and the degree of an in-focus state is detected by measuring an interval between these formed images (distance between the two images), that is, by detecting the phase difference between the two images.

In addition, pixels that receive red (R) light with the use of a color filter that lets through red light (R pixels) and pixels that receive green (G) light with the use of a color filter that lets through green light (G pixels) are disposed in the image pickup device 200 as image creating pixels. In addition to the R pixels and G pixels, pixels that receive blue (B) light with the use of a color filter that lets through blue light (B pixels) are disposed in the image pickup device 200 as image creating pixels. The image pickup device 200 will be explained with reference to FIG. 2 below. The image pickup device 200 supplies electric signals (image signals) generated by photoelectric conversion to the signal processing unit 140.

The signal processing unit 140 compensates for the image signals by performing predetermined signal processing on the electric signals supplied from the image pickup device 200. For example, after converting the electric signals supplied from the image pickup device 200 to digital electric signals (pixel values), this signal processing unit 140 performs black level compensation, defect compensation, shading compensation, mixed color compensation, and the like on the digital electric signals. Here, the black level compensation is processing in which, if a pixel value is generated from each pixel in an optical black region, the generated pixel value is subtracted from the pixel value itself of each pixel so that the pixel value of each pixel becomes "0" if the amount of light the pixel received is "0". The defect compensation is processing in which the pixel value of a pixel that does not function normally (defective pixel) among image creating pixels disposed in the image pickup device 200 is compensated for by estimating the pixel value with the use of pixel values of pixels adjacent to the defective pixel. Here, in the defect compensation performed by the signal processing unit 140, a defective pixel among the image creating pixels is compensated for, but a defective pixel among the phase difference detection pixels is not compensated for. In addition, the shading compensation is processing in which the deterioration of the luminance of a pixel that arises as the position of the pixel moves from the center to the peripheral part of the image pickup device 200 is compensated for by giving a gain to the pixel value of the pixel in accordance with the image height of the pixel, and this processing is performed on all the pixel values of pixels corresponding to a captured image. In addition, the mixed color compensation is processing in which the increasing amount of the pixel value of a pixel (color mixture) owing to leaked light from adjacent pixels is compensated for by subtracting an estimated increasing amount of the color mixture from the pixel value of the pixel. The signal processing unit 140 supplies image signals created by the phase difference detection pixels (phase-difference-detection-pixel image signals) among signals on which these pieces of compensation processing are performed to the defect compensation unit 330. In addition, the signal processing unit 140 supplies image signals created by the image creating pixels among the signals on which these pieces of compensation processing are performed to the defect compensation unit 330 and the image creating unit 150.

The image creating unit 150 performs a predetermined processing on the image signals created by the image creating pixels supplied from the signal processing unit 140 in order to create image data to be displayed on the display unit 151 and image data to be stored in the memory unit 152. This image creating unit 150 performs, for example, white-balance compensation, γ compensation, demosaic processing, image compression processing, and the like on the image signals. The image creating unit 150 supplies the image data to be displayed on the display unit 151 to the display unit 151 to cause the display unit 151 to display the image data. The image creating unit 150 supplies the image data to be stored in the memory unit 152 to the memory unit 152 to cause the memory unit 152 to store the image data.

The display unit 151 displays images on the basis of the image data supplied from the image creating unit 150. This display unit 151 is materialized by, for example, a color liquid crystal panel.

The memory unit 152 stores the image data supplied by the image creating unit 150 as image contents (image files). For example, a disk, such as a DVD (digital versatile disk), a removable recording medium or removable media, such as a memory card or semiconductor memories, can be used as this memory unit 152. In addition, these recording media can be imbedded in the image pickup apparatus 100 or can be installed as removable media in the image pickup apparatus 100.

The defective pixel information holding unit 310 holds information regarding the position of a defective pixel (defective pixel information) among the phase difference detection pixels in the image pickup device 200. The defective pixel information holding unit 310 holds, for example, the positions of defective pixels among the phase difference detection pixels as defective pixel information, in which the defective pixels are detected in the functional check of the image pickup device 200 during the manufacturing processes of the image pickup apparatus 100. This defective pixel information holding unit 310 supplies the defective pixel information to the defect compensation unit 330.

The defect compensation unit 330 compensates for the values of the defective pixels among the phase difference pixels on the basis of the defective pixel information supplied from the defective pixel information holding unit 310, and the pixel values of both phase difference pixels and image creating pixels supplied from the signal processing unit 140. First, this defect compensation unit 330 examines whether there is a defective pixel in an area where the values of a pair of phase difference detection pixels are compared with each other (comparison area) or not on the basis of the defective pixel information. If a defective edge is detected, the defect compensation unit 330 detects an edge on the basis of a distribution data obtained from the pixel values of image creating pixels adjacent to the comparison area and a distribution data obtained from the pixel values of phase difference detection pixels of a type different from that of the defective pixel. If the value of the defective pixel can be compensated for using the pixel value of the edge represented by the pixel value of a phase difference detection pixel that is a counterpart of the defective pixel, the value of the defective pixel can be compensated for on the basis of the pixel value of the edge represented by the pixel value of the phase difference detection pixel that is the counterpart of the defective pixel. The compensation performed by the defect compensation unit 330 will be explained with reference to FIG. 3A to FIG. 6D hereinafter. This defect compensation unit 330 supplies the compensated data (phase-difference-detection-pixel image signals) to the phase difference detection unit 161. Here, the defection compensation unit 330 is an example of a combination of the detection unit and the compensation unit described in the following claims.

The phase difference detection unit 161 judges whether an object to be brought into focus (focus-target object) is actually brought into focus or not through phase difference detection on the basis of the above phase-difference-detection-pixel image signals supplied from the defect compensation unit 330. Here, in this embodiment of the present disclosure, it will be assumed that the phase difference detection unit 161 makes the above judgment with the use of the phase-difference-detection-pixel image signals of phase difference detection pixels that exist in a comparison area for purposes of explanation. This phase difference detection unit 161 forms a pair of figures from pairs of pixel values of phase difference detection pixels in the comparison area, and makes an in-focus state judgment with the use of an interval between these formed images. If an object existing in an area within which focusing is performed (focusing area) is in an in-focus state, the phase difference detection unit 161 supplies information that the object is in the focus-state to the driving unit 162 as in-focus state judgment result information. If the object is not in an in-focus state, the phase difference detection unit 161 calculates an out-of-focus distance (defocus amount), and supplies information regarding the calculated defocus amount to the driving unit 162 as the in-focus state judgment result information. Here, the phase difference detection unit 161 is an example of the judgment unit described in the following claims.

The driving unit 162 drives the zoom lens 111, the aperture 112, and the focus lens 113. For example, the driving unit 162 calculates a driving amount of the focus lens 113 on the basis of the in-focus state judgment result information supplied from the phase difference detection unit 161, and moves the focus lens 113 in accordance with the calculated driving amount. If the object is in an in-focus state, this driving unit 162 keeps the position of the focus lens 113 intact. If the object is not in an in-focus state, the driving unit 162 calculates a driving amount (moving distance) on the basis of the in-focus state judgment result information that indicates the defocus amount and the position information of the focus lens 113, and moves the focus lens 113 in accordance with the driving amount (moving distance). Here, the driving unit 162 is an example of the control unit described in the following claims.

[Example of Array of Pixels Included in Image Sensor]

FIG. 2 is a schematic diagram showing an example of the array of pixels included in the image pickup device 200 according to the embodiment of the present disclosure.

In FIG. 2, descriptions will be made under the assumption that there is an X-Y coordinate system that has an X-axis showing the horizontal direction, and a Y-axis showing the vertical direction. In addition, in FIG. 2, it will be assumed that the point of the bottom-left corner is the origin of the X-Y coordinate system, and the direction from bottom to top is the positive direction of the Y-axis, and the direction from left to right is the positive direction of the X-axis. It will be also assumed that the image pickup device 200 reads signals by scanning pixels along the X-axis direction from left to right (the signals are read out in the units of rows of the pixel array).

Explanations will be made with the use of an area of some of the pixels included in the image pickup device 200 (an array of 18 rows-by-18 columns pixels) which is depicted as an area 210 in FIG. 2. An array of pixels included in the image pickup device 200 is composed of plural arrays of pixels which are repeatedly arranged in units of the arrays of 18 rows-by-18 columns pixels shown in the area 210 in the X-axis direction and in the Y-axis direction.

In FIG. 2, a pixel is represented by a square. In particular, an image creating pixel is represented by a square with a mark (R, G, or B) therein, where R, G, and B respectively represent red, green, and blue color filters installed on the pixels. In other words, in FIG. 2, an R pixel of the image creating pixels is depicted as an R pixel 211, and a B pixel is depicted as a B pixel 214. As for G pixels, a G pixel included in a row in which R pixels (R pixels 211) are included is depicted as a Gr pixel (Gr pixel 212), and a G pixel included in a row in which B pixels (B pixels 214) are included is depicted as a Gb pixel (Gb pixel 213) in FIG. 2.

In addition, a phase difference detection pixel is represented by a gray square with a white rectangular mark therein. Here, the white rectangular mark represents a part of a phase difference detection pixel through which incident light passes and is received by a light-sensitive element without being blocked by a light-blocking layer. In other words, the white rectangular mark represents an opening of the light-blocking layer. The two types of phase difference detection pixels (a right-opening phase difference detection pixel 215 and a left-opening phase difference detection pixel 216) shown in FIG. 2 will be explained below.

The right-opening phase difference detection pixel 215 is a phase difference detection pixel having a blocking layer that allows a right half of the light-sensitive element to receive incident light and prevents a left half of the light-sensitive element from receiving the incident light. In other words, regarding light incident on a microlens of the right-opening phase difference detection pixel 215, the right-opening phase difference detection pixel 215 blocks some of the object light passing through the right half of an exit pupil (at the positive X-axis direction side). In addition, regarding the light incident on the microlens of the right-opening phase difference detection pixel 215, the right-opening phase difference detection pixel 215 allows some of the object light passing through the left half of the exit pupil (at the negative X-axis direction side) to be received by the light-sensitive element.

The left-opening phase difference detection pixel 216 is a phase difference detection pixel having a blocking layer that allows a left half of a light-sensitive element to receive incident light and prevents a right half of the light-sensitive element from receiving the incident light. In other words, regarding the light incident on a microlens of the left-opening phase difference detection pixel 216, the left-opening phase difference detection pixel 216 blocks some of the object light passing through the left half of an exit pupil (at the negative X-axis direction side). In addition, regarding the light incident on the microlens of the left-opening phase difference detection pixel 216, the left-opening phase difference detection pixel 216 allows some of the object light passing through the right half of the exit pupil (at the positive X-axis direction side) to be received by the light-sensitive element. In addition, the right-opening phase difference detection pixels 215 and the left-opening phase difference detection pixels 216 are used in pairs, so that each pair of the two pixels forms a pair of figures.

The array of the pixels in the image pickup device 200 will be explained hereinafter.

In the image pickup device 200, plural rows (lines) where the image creating pixels are disposed, and one row (line) where phase difference detection pixels are disposed are alternately arranged in the direction perpendicular to the direction of the scanning for reading signals. In FIG. 2, it will be assumed that the number of the above plural rows composed of the image creating pixels is five. In addition, in the above plural rows, the image creating pixels are disposed in the Bayer array. In addition, FIG. 2 shows that two rows composed of image creating pixels that are next to a row composed of phase difference detection pixels are composed of R pixels and Gr pixels as an example for purposes of illustration.

Next, under the assumption that there is a defective pixel among the phase difference detection pixels shown in FIG. 2, the compensation of the pixel value of the defective pixel performed by the defect compensation unit 330 will be explained with the use of an array of 2 rows-by-14 columns (an area 220) shown in FIG. 2.

[Example of Edge Detection Performed by Defect Compensation Unit]

Figure 3A:
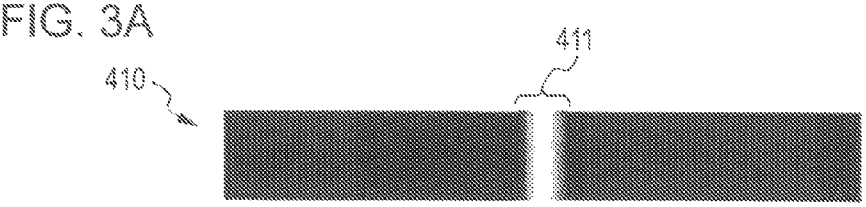
FIG. 3A, FIG. 3B, and FIG. 3C show an example of edge detection performed by a defect compensation unit according to the embodiment of the present disclosure.
Figure 3B:
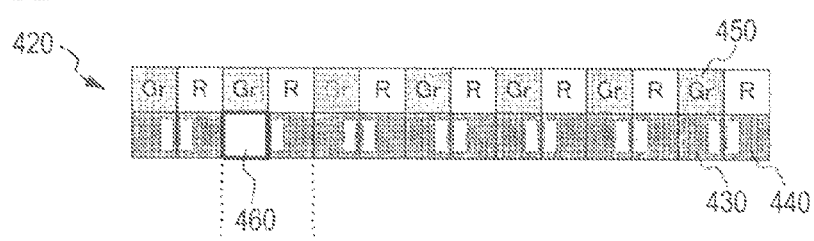
Figure 3C:
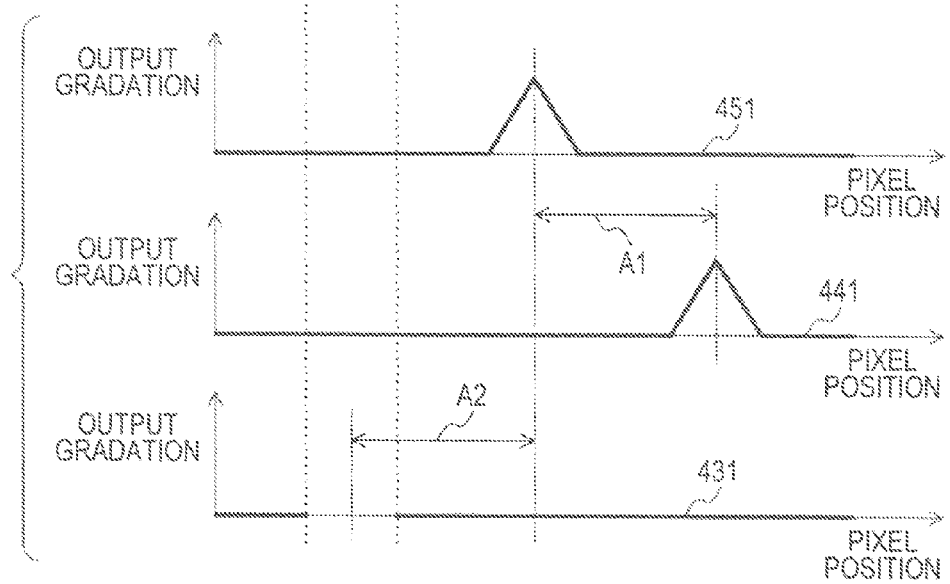

FIG. 3A, FIG. 3B, and FIG. 3C show an example of edge detection performed by the defect compensation unit 330 according to this embodiment of the present disclosure.

FIG. 3A schematically shows an area depicting an imaged object (imaged area 410). In addition, an edge is schematically shown by a white area (area 411) in the imaged area 410. Explanations will be made under the assumption that only the area 411 gives off light and remaining parts of the imaged area 410 is pitch-dark in FIG. 3A.

FIG. 3B shows an area of pixels (pixel area 420) that takes an image of the imaged area 410 shown in FIG. 3A. This pixel area 420 includes a row of 14 phase difference detection pixels and a row of 14 image creating pixels. In addition, the pixel area 420 shows that a right-opening phase difference detection pixel (one of the right-opening phase difference detection pixels 430) that is located at the third column from the left in the row composed of the phase difference detection pixels is a defective pixel (defective pixel 460). In addition, in FIG. 3B, it will be assumed that there is no defective pixels among the left-opening phase difference detection pixels (left-opening difference detection pixels 440). In addition, the pixel area 420 shows that image creating pixels which are searched for an edge by the defect compensation unit 330 (G pixels 450) are represented by squares with small dots therein. The G pixels 450 will be later explained in FIG. 3C.

FIG. 3C schematically shows the edge detected by the defect compensation unit 330 when an image of the imaged area 410 shown in the FIG. 3A is taken by the pixel area 420 depicted in FIG. 3B.

Explanations regarding FIG. 3C will be made under the assumption that an area (range) of the row of the phase difference detection pixels in the pixel area 420 shown in FIG. 3B is a comparison area where the value of each pair of phase difference detection pixel is compared with each other for detecting an out-of-focus distance regarding a focus-target object.

In FIG. 3C, each graph schematically shows an edge detected by the defect compensation unit 330 with a vertical axis representing the intensity of each pixel (output gradation) and a horizontal axis representing the position of each pixel (pixel position). FIG. 3C shows a distribution data (distribution data 451) of pixel values created from the pixel values of the G pixels (G pixel 450) in the pixel area 420, and a distribution data (distribution data 441) of pixel values created from the pixel values of the left-opening phase difference detection pixels in the pixel area 420. In addition, FIG. 3C includes a distribution data (distribution data 431) created from the pixel values of the right-opening phase difference detection pixels.

Next, the edge detection performed by the defect compensation unit 330 will be explained with reference to FIG. 3C. First, the defect compensation unit 330 checks whether there is a defective pixel within the comparison area or not on the basis of the defective pixel information. If there is a defective pixel, the defect compensation unit 330 detects an edge from the pixel values of image creating pixels adjacent to the comparison area. Here, in this embodiment of the present disclosure, it will be assumed that the pixel values of the G pixels (G pixels 450 shown in FIG. 3B) are used as the pixel values of the image creating pixels. In other words, the defect compensation unit 330 creates the distribution data (distribution data 451) of the pixel values of the G pixels, and detects an edge (a protruding output gradation) in the distribution data 451.

If an edge is detected from the pixel values of the G pixels, the defect compensation unit 330 detects an edge from the pixel values of phase difference detection pixels of a type different from that of the defective pixel (defective pixel 460). Here, as shown in FIG. 3B, because it is assumed that the defective pixel 460 is a right-opening phase difference detection pixel, the edge is detected from the pixel values of the left-open phase difference detection pixels (left-open phase difference detection pixels 440). In other words, the defect compensation unit 330 creates the distribution data (distribution data 441) of the pixel values of the left-open phase difference detection pixels, and detects an edge (a protruding output gradation) in the distribution data 441.

Subsequently, if an edge is detected from the distribution data (distribution data 441) of the pixel values of the phase difference detection pixels of a type different from that of the defective pixel, the defect compensation unit 330 measures a distance between this edge and the edge detected from the pixel values of the G pixels (interval A1). Next, the defect compensation unit 330 checks whether the position of the defective pixel and the position of the edge represented by the pixel value of a phase difference detection pixel that is a counterpart of the defective pixel are situated symmetrically with respect to the position of the edge represented by the pixel values of G pixels or not. In other words, the distribution data of the pixel values of the right-opening phase difference detection pixels (distribution data 431) is created, and it is examined whether an interval between the position represented by the pixel value of the defective pixel (middle point of a line segment that is not a bold line segment on a half line that shows the distribution data 431) and the position of the edge represented by the pixel values of the G pixels (interval A2) is the same as the interval A1 or not.

Next, the compensation of the pixel value of the defective pixel 460 in the case where it is judged that the interval A2 is equivalent to the interval A1 will be explained with reference to FIG. 4A and FIG. 4B.

[Example of Compensation of Pixel Value of Defective Pixel Performed by Defect Compensation Unit]

Figure 4A:
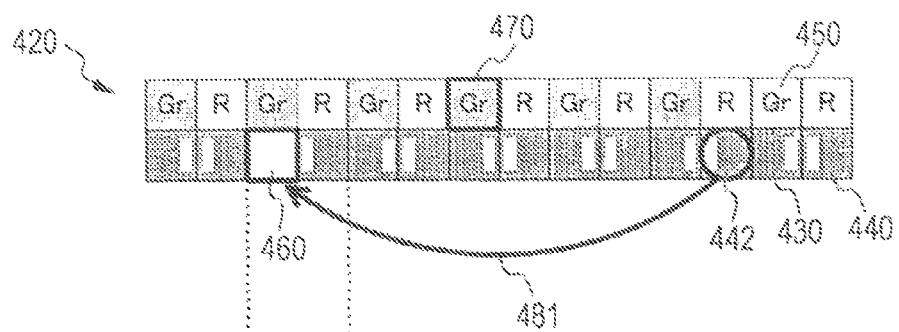
FIG. 4A and FIG. 4B are schematic diagrams showing an example of the compensation of the pixel value of a defective pixel performed by the defect compensation unit according to the embodiment of the present disclosure.
Figure 4B:
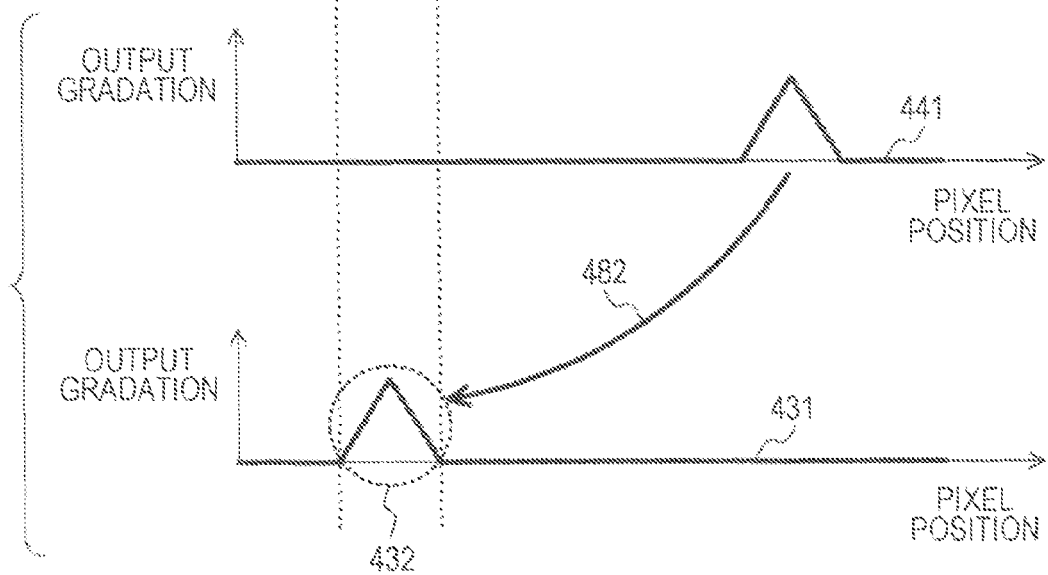

FIG. 4A and FIG. 4B are schematic diagrams showing an example of the compensation of the pixel value of a defective pixel performed by the defect compensation unit 330 according to this embodiment of the present disclosure.

In this FIG. 4A and FIG. 4B, components that correspond to those of FIG. 3A, FIG. 3B or FIG. 3C are indicated by the same reference numerals and their detailed explanation will be omitted.

In FIG. 4A, the compensation of the pixel value of the defective pixel (defective pixel 460) in the case where the interval A2 is equivalent to the interval A1 is schematically explained with reference to the pixel array (pixel area 420) shown in FIG. 3B (Refer to FIG. 3C about the interval A1 and the interval A2). In addition, in FIG. 4A, a pixel that outputs the edge represented by the distribution data 451 in FIG. 3C is shown as an image creating pixel boxed by a bold line (Gr pixel 470). In addition, in FIG. 4A, a pixel that outputs the edge represented by the distribution data 441 in FIG. 3C is shown as a phase difference detection pixel circled by a bold line (phase difference detection pixel 442).

In addition, in FIG. 4A, it is schematically shown by an arrow 481 that the pixel value of the defective pixel 460 is compensated for on the basis of the pixel value of the phase difference detection pixel 442.

The compensation of the pixel value of a defective pixel performed by the defect compensation unit 330 in the case where the interval A2 and the interval A1 have the same length will be explained below.

First, the principle of the compensation performed by the defect compensation unit 330 will be explained. If image pickup performed by the image pickup apparatus is in focus, the position of an edge represented by the pixel value of one of a pair of phase difference detection pixels and the position of an edge represented by the pixel value of the other of a pair of phase difference detection pixels coincide with each other (In FIG. 3C, the position of the edge represented by the distribution data 441 and the position of the edge represented by the distribution data 431 overlap each other). On the other hand, if the image pickup performed by the image pickup apparatus is out of focus, the positions of the two edges depart from each other with a position at which the two edges are to be matched with each other when the image pickup is in focus as the middle point of the distance between them. The distance between the positions of the two edges is determined in accordance with the out-of-focus distance (defocus amount). In addition, the pixel values (output gradations) at the two edges become equivalent to each other. In other words, in the case where the pixel value of the defective pixel is to represent an edge, if a position at which an edge represented by the pixel value of a phase difference detection pixel that is a counterpart of the defective pixel is to be matched with the edge represented by the value of the defective pixel when the image pickup is in focus is detected, the pixel value of the defective pixel can be compensated for with the use of the pixel value of the edge represented by the pixel value of the phase difference detection pixel.

Here, the defect compensation unit 330 detects the position of an edge represented by the pixel value of the relevant image creating pixel (G pixel) as the position at which an edge represented by the pixel value of a phase difference detection pixel that is a counterpart of the defective pixel is to be matched with the edge represented by the value of the defective pixel when the image pickup is in focus. Subsequently, with the use of the detected position of the edge and the edge represented by the pixel value of the phase difference detection pixel that is a counterpart of the defective pixel, the defect compensation unit 330 examines whether the pixel value of the defective pixel represents an edge or not. Subsequently, if the pixel value of the defective pixel represents an edge, the defect compensation unit 330 compensates for the pixel value of the defective pixel by setting the pixel value of the phase difference detection pixel that is the counterpart of the defective pixel to be the pixel value of the defective pixel.

In FIG. 4B, compensation in which the pixel value of the phase difference detection pixel that is a counterpart of the defective pixel is set to be the pixel value of the defective pixel is schematically shown with the use of the distribution data 441 and the distribution data 431 shown in FIG. 3C. In addition, in FIG. 4B, it is schematically shown by an arrow 482 that the pixel value of the defective pixel 460 is compensated for on the basis of the pixel value of the phase difference detection pixel that is the counterpart of the defective pixel 460. In addition, in FIG. 4B, the pixel value of the defective pixel 460 that is compensated for by copying the pixel value shown by an arrow 482 is shown in a dotted circle 432.

As described above, in the case where the defective pixel is in the position where the image of the edge is to be picked up, the defect compensation unit 330 compensates for the pixel value of the defective pixel on the basis of the pixel value of the edge represented by the pixel value of the phase difference detection pixel that is the counterpart of the defective pixel. By this method, the accuracy of the compensation can be improved.

Next, compensation performed by the defect compensation unit 330 in the case where the defective pixel is not in the position where the image of an edge is to be picked up will be explained. In the phase difference detection performed by the phase difference detection unit 161, information regarding an edge in the comparison area becomes important information. In the case where the defective pixel is not in the position where the image of the edge is to be picked up, even if the accuracy of the compensation of the pixel value of the defective pixel is improved, the accuracy of the phase difference detection is little affected. Therefore, in the case where the defective pixel is not in the position where the image of the edge is to be picked up, the defect compensation unit 330 compensates for the pixel value of the defective pixel on the basis of the pixel values of adjacent phase difference detection pixels of the same type as that of the defective pixel in a similar way to related compensations.

By this method, the speed of the compensation in the case where the defective pixel is not in the position where the image of the edge is to be picked up is improved. In other words, the defect compensation unit 330 can speedily perform compensation by improving only the accuracy of compensations for which high accuracy is necessary.

Next, compensation in the case where the edge represented by the pixel value of the phase difference detection pixel that is the counterpart of the defective pixel is out of the comparison area will be explained with reference to FIG. 5A to FIG. 5D.

[Example of Compensation of Pixel Value of Defective Pixel Performed by Defect Compensation Unit 330]

FIG. 5A to FIG. 5D are schematic diagrams showing an example of the compensation of the pixel value of a defective pixel in the case where an edge represented by the pixel value of a phase difference detection pixel that is a counterpart of the defective pixel is out of a comparison area in this embodiment of the present disclosure.

Figure 5A:
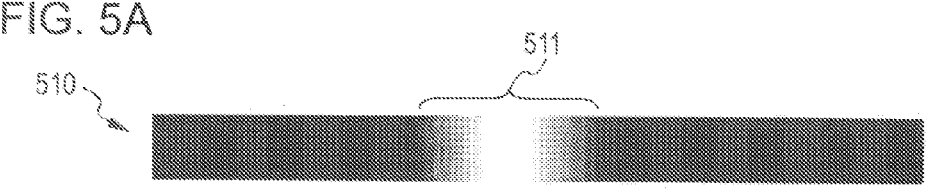
FIG. 5A to FIG. 5D are schematic diagrams showing an example of the compensation of the pixel value of a defective pixel in the case where an edge represented by the pixel value of a phase difference detection pixel that is a counterpart of the defective pixel is out of a comparison area in the embodiment of the present disclosure.
Figure 5B:
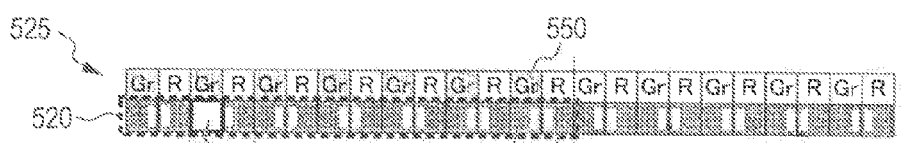
Figure 5C:
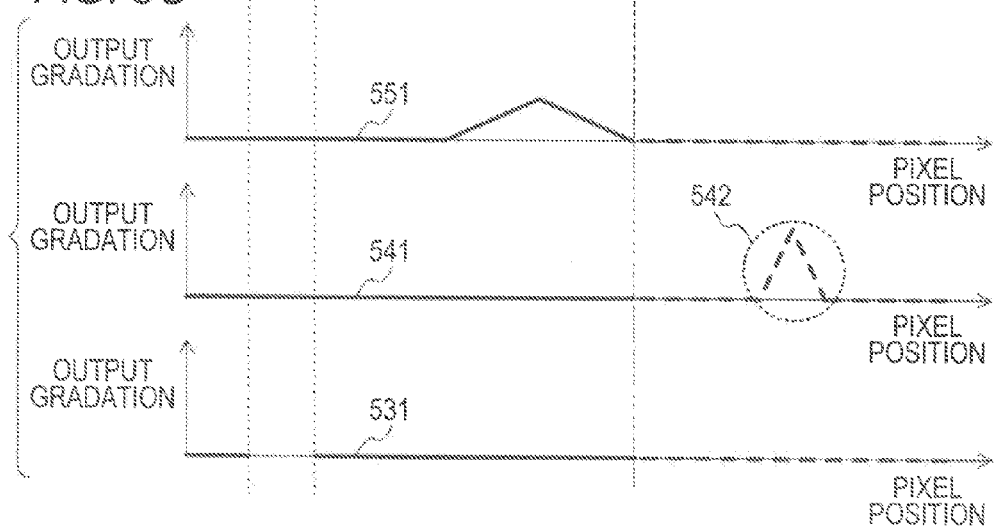

In FIG. 5A, an area (imaged area 510), which depicts an object (imaged object) providing pixel values shown in FIG. 5C, is schematically shown. In addition, the imaged area 510 shows a white area (area 511) that schematically shows the edge.

FIG. 5B shows an area (pixel area 525) that depicts pixels for imaging the imaged area 510 shown in FIG. 5A. This pixel area 525 includes 24 phase difference detection pixels disposed in a row and 24 image creating pixels disposed in a row.

In addition, the pixel area 525 includes a defective pixel 560, Gr pixels 550, right-opening phase difference detection pixels 530, and left-opening phase difference detection pixels 540. Here, because the defective pixel 560, the Gr pixels 550, the right-opening phase difference detection pixels 530, and the left-opening phase difference detection pixels 540 are respectively similar to the defective pixel 460, the Gr pixels 450, the right-opening phase difference detection pixels 430, and the left-opening phase difference detection pixels 440 shown in FIG. 3A, their detailed explanation will be omitted.

In addition, FIG. 5B shows an area in which a pair of phase difference detection pixels whose pixel values are compared resides (comparison area 520). The phase difference detection unit 161 examines an interval between figures (edges) on the basis of the pixel values of the phase difference detection pixels that are disposed in this comparison area 520, and detects an out-of-focus distance regarding a focus-target object. In other words, the pixel values of phase difference detection pixels out of this comparison area 520 are not used, and the defect compensation unit 330 detects an edge using only the pixel values of the phase difference detection pixels that are situated within the comparison area 520 to perform compensation. In addition, the defect compensation unit 330 detects an edge on the basis of the pixel values of pixels corresponding (adjacent) to the comparison area 520 (the Gr pixels 550).

FIG. 5C schematically shows the distribution data of the Gr pixels 550 corresponding to the comparison area 520 in FIG. 5B (distribution data 551), and the distribution data of the left-opening phase difference detection pixels 540 (distribution data 541) with the use of bold solid lines. In addition, FIG. 5C schematically shows the distribution data of the right-opening phase difference detection pixels 530 (distribution data 531) with the use of a bold solid line.

Here, the distribution data 551, the distribution data 541, and the distribution data 531 respectively corresponds to the distribution data 451, the distribution data 441, and the distribution data 431 shown in FIG. 3C.

In addition, shown to the right side of each of the above distribution data are three distribution data depicted in dotted lines, and these three distribution lines are represented by the pixel values of pixels out of the comparison area 520 in the pixel area 525.

The compensation of the pixel value of a defective pixel in the case where an edge represented by the pixel value of a phase difference detection pixel that is a counterpart of the defective pixel is out of the comparison area will be described hereinafter.

An edge that is out of the comparison area (comparison area 520), such as an edge that is depicted in a bold dotted line and resides to the right side of the distribution data 541 (an edge in a circle 542), is not detected by the defect compensation unit 330.

However, in the above-described phase difference detection, an out-of-focus distance is calculated with the use of a pair of distribution data represented by the pixel values of the phase difference detection pixels situated within the comparison area 520. Therefore, in the case where one of a pair of edges is out of the comparison area, because the one of the pair of edges is not detected, the accuracy of an out-of-focus distance is not improved even if the pixel value of a defective pixel is accurately compensated for. To cope with this problem, in this embodiment of the present disclosure, the compensation of the pixel value of a defective pixel with the use of the pixel value of a pixel out of the comparison area is not performed as explained below, so that the accuracy of calculation of an out-of-focus distance is not lowered and the speed of the calculation is improved.

In FIG. 5C, in the case where an edge represented by the pixel value of a phase difference detection pixel that is a counterpart of the defective pixel is out of the comparison area, an example of the compensation of the defective pixel that is performed on the basis of pixel values of pixels adjacent to the defective pixel is schematically shown with the use of the pixel array shown in FIG. 5B.

Figure 5D:
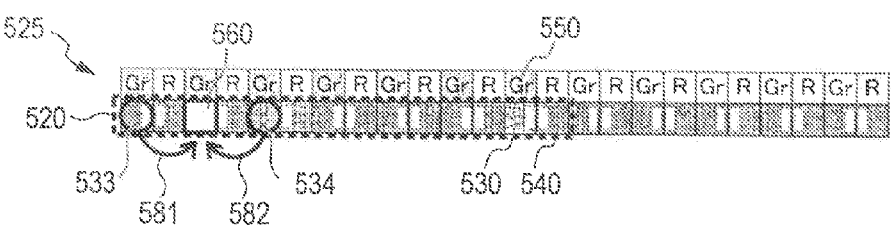

In FIG. 5D, phase difference detection pixels whose pixel values are used for the compensation of the pixel value of the defective pixel are shown as phase difference detection pixels circled in a bold dotted line (a right-opening phase difference detection pixel 533 and a right-opening phase difference detection pixel 534). In addition, in FIG. 5D, it is schematically shown by arrows 581 and 582 that the pixel value of the defective pixel 560 is compensated for on the basis of the pixel values of the right-opening phase difference detection pixel 533 and the right-opening phase difference detection pixel 534.

As shown in FIG. 5C, in the case where an edge represented by the pixel value of a phase difference detection pixel that is a counterpart of the defective pixel is not detected, the pixel value of the defective pixel is compensated for with the use of the average pixel value of the pixel values of adjacent phase difference detection pixels of the same type as that of the defective pixel (the right-opening phase difference detection pixel 533 and the right-opening phase difference detection pixel 534).

[Example of Phase Difference Detection]

FIG. 6A to FIG. 6D are schematic diagrams showing an example of a phase difference detection with the use of data obtained by the compensation of a defective pixel according to this embodiment of the present disclosure and an example of a phase difference detection according to a related compensation of a defective pixel.

In FIG. 6A to FIG. 6D, it will be assumed that the image area 410 shown in FIG. 3A is imaged.

Figure 6A:
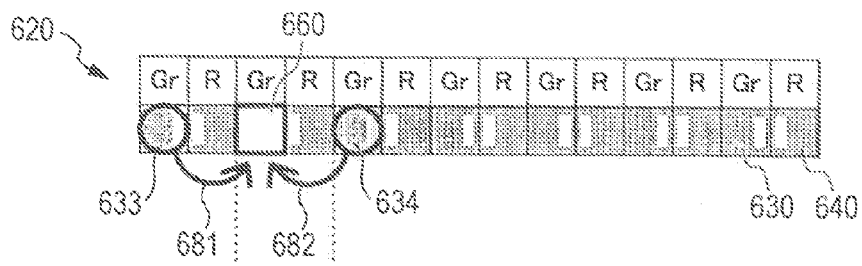
FIG. 6A to FIG. 6D are schematic diagrams showing an example of a phase difference detection with the use of data obtained by the compensation of a defective pixel according to the embodiment of the present disclosure and an example of a phase difference detection according to a related compensation of a defective pixel.
Figure 6B:
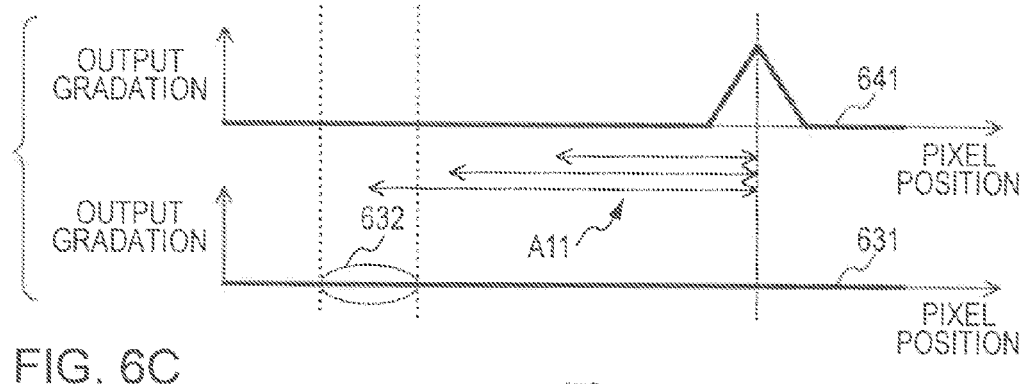

FIG. 6A and FIG. 6B schematically show an example of a phase difference detection according to the related compensation of a defective pixel. FIG. 6A schematically shows the related compensation of the defective pixel along with a pixel array. Here, because a pixel area 620, right-opening phase difference detection pixels 630, left-opening phase difference detection pixels 640, and a defective pixel 660 are respectively similar to the pixel area 420, right-opening phase difference detection pixels 430, left-opening phase difference detection pixels 440, and the defective pixel 460 shown in FIG. 3B, their detailed explanation will be omitted. In addition, in FIG. 6A, phase difference detection pixels whose pixel values are used for the compensation of the pixel value of the defective pixel are shown as phase difference detection pixels circled in bold lines (right-opening phase difference detection pixels 633 and 634). In addition, in FIG. 6A, it is schematically shown by arrows 681 and 682 that the pixel value of the defective pixel 660 is compensated for on the basis of the pixel values of the right-opening phase difference detection pixel 633 and the right-opening phase difference detection pixel 634.

As shown in FIG. 6A, the related compensation of the pixel value of a defective pixel is performed, for example, by using the average pixel value of the pixel values of the adjacent phase difference detection pixels of the same type as that of the defective pixel (right-opening phase difference detection pixels 633 and 634).

FIG. 6B shows distribution data created with the use of the result of the compensation of the defective pixel shown in FIG. 6A (distribution data 641 and distribution data 631). Here, the distribution data 641 is distribution data created on the basis of the pixel values of the left-opening phase difference detection pixels 640, and the distribution data 631 is distribution data created on the basis of the pixel values of the right-opening phase difference detection pixels 630. In addition, FIG. 6B shows the pixel value of the defective pixel 660 compensated for with the use of the average value of the pixel values of the right-opening phase difference detection pixels 633 and 634 shown in FIG. 6A. The compensated pixel value of the defective pixel 660 is represented as distribution data surrounded by an oval 632.

In the compensation of the pixel value of the defective pixel 660 according to the related compensation method, the average pixel value (output gradation) of the pixel values of the right-opening phase difference detection pixels 633 and 634 is set to be the pixel value of the defective pixel 660. In other words, if both pixel values of the right-opening phase difference detection pixels 633 and 634 are "0", the pixel value of the defective pixel 660 becomes "0". If the pixel value of the defective pixel 660 is to represent an edge, such a compensation can not accurately compensate for the pixel value of the defective pixel 660. As a result, because one of two edges to be used for measuring an interval in phase difference detection is not detected (Refer to an interval A11 in FIG. 6B), there arises a problem in that an accurate phase difference detection can not be performed.

Figure 6C:
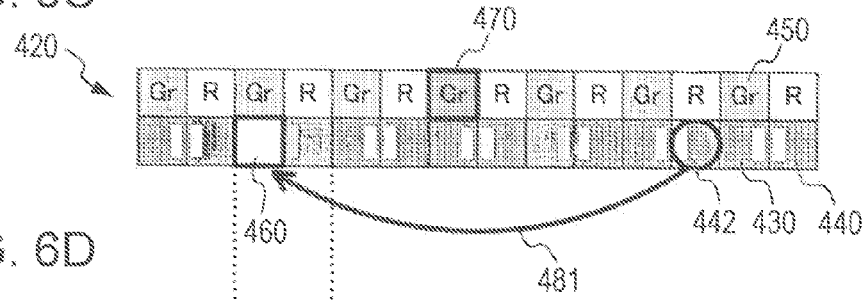
Figure 6D:
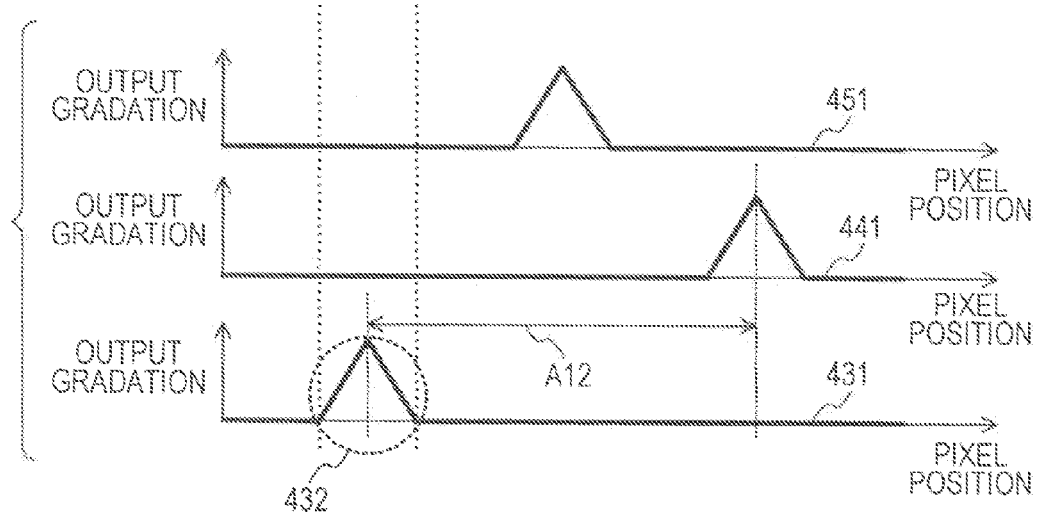

FIG. 6C and FIG. 6D schematically show an example of a phase difference detection after the compensation of the pixel value of the defective pixel is performed by the defect compensation unit 330 according to this embodiment of the present disclosure.

Here, because FIG. 6C is the same as FIG. 4A, its detailed explanation will be omitted.

FIG. 6D shows the distribution data 451 and 441 which are similar to those shown in FIG. 3C, and the distribution data 431 and the distribution data in a dotted circle 432 which are similar to those shown in FIG. 4B. In addition, FIG. 6D shows an interval (interval A12) between an edge of the distribution data 441 and an edge of the distribution data 431.

As indicated by the interval A12, if an edge is supposed to be detected at the position of the defective pixel, the compensation according to this embodiment of the present disclosure can accurately perform a phase difference detection by compensating the pixel value of the defective pixel with the use of the pixel value of a phase difference detection pixel that is a counter part of the defective pixel.

[Example of a Pixel Array Including Plural Defective Pixels]

Figure 7A:
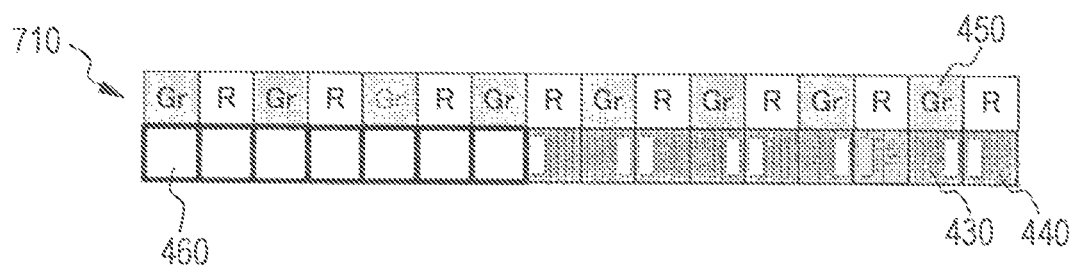
FIG. 7A and FIG. 7B are schematic diagrams showing an example of a pixel array including plural defective pixels regarding which phase differences can be detected by compensation according to the embodiment of the present disclosure.
Figure 7B:
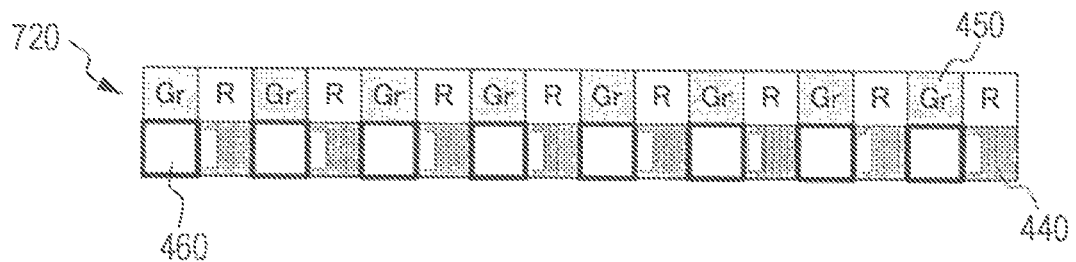

FIG. 7A and FIG. 7B are schematic diagrams showing an example of a pixel array including plural defective pixels regarding which phase differences can be detected by the compensation according to this embodiment of the present disclosure.

Although plural defective pixels are included in FIG. 7A and FIG. 7B, these components that correspond to those of FIG. 3B are indicated by the same reference numerals and their detailed explanation will be omitted.

FIG. 7A shows an example of an image area (image area 710) where plural defective pixels (defective pixels 460) gather together. Even in such a case, the pixel value of a defective pixel can be compensated for with the use of the pixel value of a phase difference detection pixel that is a counterpart of the defective pixel if an edge represented by the pixel value of the relevant Gr pixel 450 and an edge represented by the pixel value of the phase difference detection pixel that is the counterpart of the defective pixel are detected.

In other words, even in the case where there are plural defective pixels as shown in the pixel area 710, phase difference detection can be accurately performed after compensation performed by the defect compensation unit 330.

FIG. 7B shows an example of an image area (image area 720) where plural phase difference detection pixels belonging one type of a pair of two types of phase difference detection pixels are defective pixels. Even in such a case, phase difference detection can be accurately performed if an edge represented by the pixel value of the relevant Gr pixel 450 and an edge represented by the pixel value of the phase difference detection pixel that is a counterpart of a defective pixel are detected.

In other words, even in the case where one of each pair of defective pixels is a defective pixel as shown in the pixel area 720, phase difference detection can be accurately performed after compensation performed by the defect compensation unit 330.

[Example of Operation of Image Pickup Apparatus]

Next, the operation of the image pickup apparatus 100 according to this embodiment of the present disclosure will be explained with reference to the accompanying drawings.

FIG. 8 is a flowchart showing an example of an image pickup processing procedure for the compensation of a defective pixel of phase difference detection pixels performed by the image pickup apparatus 100 according to this embodiment of the present disclosure.

First, the control unit 130 judges whether an image-pickup-operation start instruction for picking up an image is issued by a user or not (at step S901). If it is judged that the image-pickup-operation start instruction for picking up an image is not issued by a user (No at step S901), this image pickup processing procedure is ended.

On the other hand, if it is judged that the image-pickup-operation start instruction for picking up an image is issued by a user (Yes at step S901), the phase difference detection unit 161 sets a comparison area used for calculating a defocus amount regarding a focus-target object (at step S902). Next, the image of the object is captured, and the captured image is obtained by the image pickup device 200 (at step S903).

Next, defect compensation processing in which the pixel value of a defective difference detection pixel is compensated for is performed on the basis of the pixel values of phase difference detection pixels within the comparison area and the pixel values of image creating pixels adjacent to the comparison area (G pixels in this embodiment of the present disclosure) by the defect compensation unit 330 (at step S910). The defect compensation processing (at step S910) will be explained with reference to FIG. 9 later. Here, step S910 is an example of the detection procedure and compensation procedure described in the following claims.

Afterward, phase difference detection processing, in which the defocus amount is calculated through phase difference detection, is performed by the phase difference detection unit 161 (at step S904). Subsequently, focusing processing, in which the focus lens 113 is driven by the driving unit 162 and the focus-target object is brought into focus, is performed (at step S905).

Next, the control unit 130 judges whether a shutter button is pushed or not at the operation receiving unit 120 (at step S906). If it is judged that the shutter button is not pushed (No at step S906), the flow proceeds to step S909.

On the other hand, if it is judged that the shutter button is pushed (Yes at step S906), a still image is picked up by the image pickup device 200 (at step S907). Next, the still image on which signal processing is performed by the image creating unit 150 is recorded by the memory unit 152 (at step S908).

Next, the control unit 130 judges whether an image-pickup-operation stop instruction for stopping the still image pickup operation is issued by a user or not (at step S909). If it is judged that the image-pickup-operation stop instruction for stopping the still image pickup operation is not issued by the user (No at step S909), the flow goes back to step S902.

On the other hand, if it is judged that the image-pickup-operation stop instruction for stopping the still image pickup operation is issued by a user (Yes at step S909), this image pickup processing procedure is ended.

Figure 9:
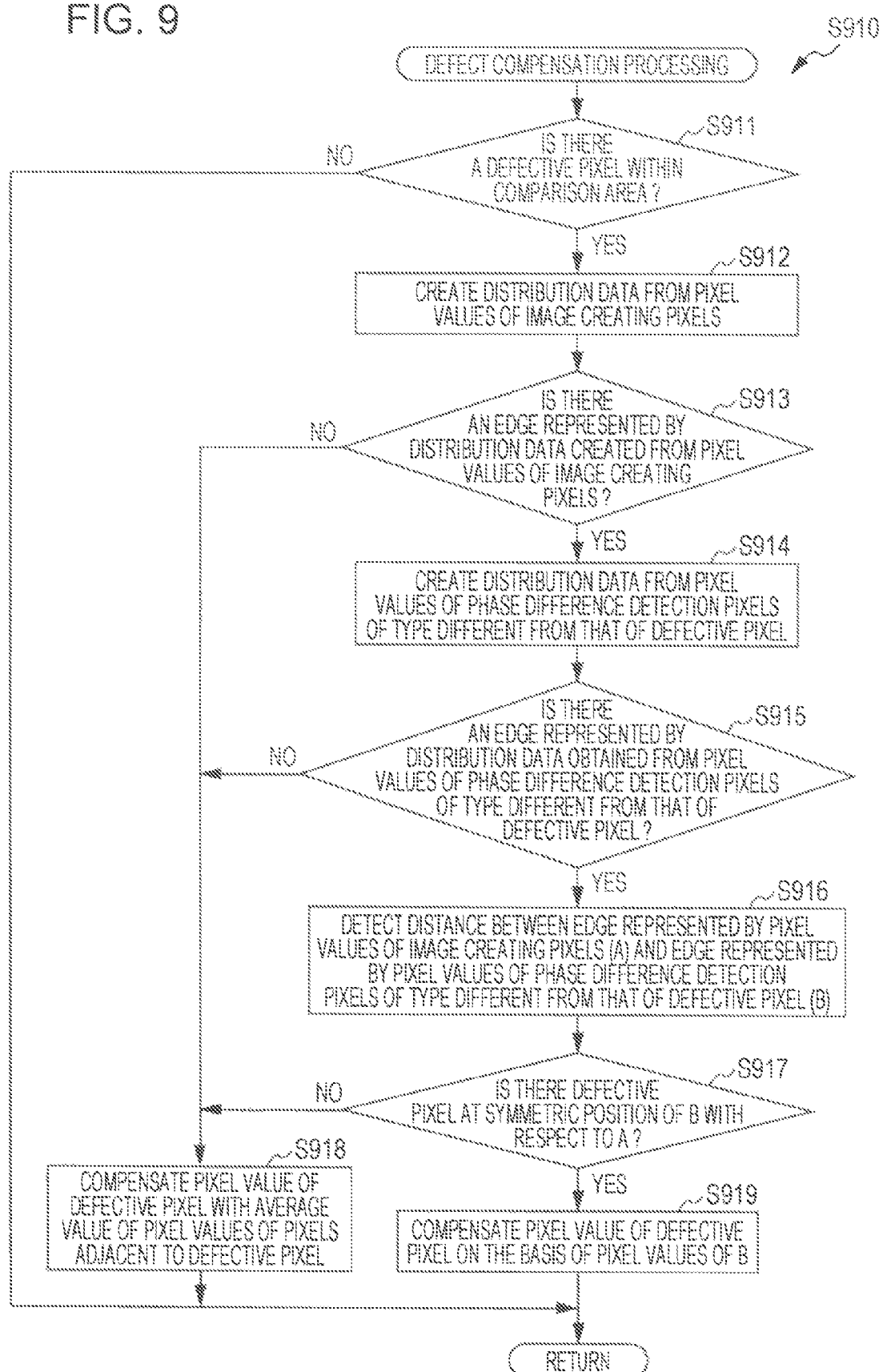
FIG. 9 is a flowchart showing an example of defect compensation processing performed in an image pickup processing operation according to the embodiment of the present disclosure.

FIG. 9 is a flowchart showing an example of defect compensation processing (at step S910) performed in an image pickup processing operation according to this embodiment of the present disclosure.

First, the defect compensation unit 330 judges whether there is a defective pixel among phase difference detection pixels within the area where a phase difference is detected (the comparison area) or not on the basis of defective pixel information supplied from the defective pixel information holding unit 310 (at step S911). If it is judged that there is no defective pixel among the phase difference detection pixels within the compensation area (No at step S911), this defect compensation processing procedure is ended.

On the other hand, if it is judged that there is a defective pixel among the phase difference detection pixels within the compensation area (Yes at step S911), the distribution data of the pixel values of image creating pixels (for example, G pixels) adjacent to the comparison area is created (at step S912).

Next, it is judged whether there is an edge represented by the distribution data created from the pixel values of the image creating pixels or not (at step S913). If it is judged that there is no edge represented by the distribution data of the image creating pixels, the flow proceeds to step S918 (at step S913).

On the other hand, if it is judged that there is an edge represented by the distribution data (Yes at step 913), the distribution data represented by the pixel values of phase difference detection pixels of a type different from that of the defective pixel is created (at step S914). Next, it is judged whether there is an edge represented by this created distribution data obtained from the pixel values of the phase difference detection pixels of the type different from that of the defective pixel or not (at step S915). If it is judged that there is no edge represented by the distribution data obtained from the pixel values of the phase difference detection pixels (No at step S915), the flow proceeds to step S918.

On the other hand, if it is judged that there is an edge represented by the distribution data obtained from the pixel values of the phase difference detection pixels of the type different from that of the defective pixel (Yes at step S915), a distance between the edge (A) represented by the pixel values of the image creating pixels and the edge (B) represented by the pixel values of the phase difference detection pixels of the type different from that of the defective pixel is detected (at step S916). Next, it is judged whether there is a defective pixel at the symmetric position of the edge (B) represented by the pixel values of the phase difference detection pixels of the type different from that of the defective pixel with respect to the edge (A) represented by the pixel values of the image creating pixels or not (at step S917). If it is judged that there is no edge at the symmetric position of the edge (B) (No at step S917), the pixel value of the defective pixel is compensated for with the use of the average pixel value of the pixel values of phase difference detection pixels that receive light whose direction is the same as those of light the defective pixels would receive (at step S918). After step S918, the defect compensation processing procedure is ended.

On the other hand, if it is judged that there is an edge at the symmetric position of the edge (B) (Yes at step S917), the pixel value of the defective pixel is compensated for on the basis of the pixel value of the edge (B) represented by the pixel values of the phase difference detection pixels of the type different from that of the defective pixel (at step S919), and the defect compensation processing procedure is ended.

As described above, according to this embodiment of the present disclosure, the accuracy of the compensation of the pixel value of a defective pixel that is a phase difference detection pixel can be improved by compensating the pixel value of the defective pixel with the use of the pixel values of the phase difference detection pixels of the type different from that of the defective pixel. In particular, only when an edge is supposed to be detected at the position of a defective pixel, the pixel value of the defective pixel is compensated for with the use of the pixel value of a phase difference detection pixel that is a counterpart of the defective pixel. In other words, highly accurate compensation can be performed only when the defective pixel is involved in the in-focus judgment. Because the pixel value of a defective pixel is compensated for with the use of the pixel value of a phase difference detection pixel that is a counterpart of the defective pixel only when an edge is supposed to be detected at the position of the defective pixel, the load of the compensation of the pixel value of a defective pixel can be reduced. In addition, because the accuracy of compensation is improved in the case where an edge is supposed to be detected at the position of a defective pixel, the accuracy of detection of an edge through phase difference detection is improved in the case where an image of an high frequency object or an object with a high contrast is taken by the image pickup apparatus according to this embodiment of the present disclosure. In other word, the image pickup apparatus according to this embodiment of the present disclosure has an improved phase difference autofocus function.

In addition, in a related image pickup apparatus, because the pixel value of a defective pixel is compensated for with the use of the pixel values of adjacent phase difference detection pixels, if there is an image area where plural defective pixels gather together, there is a possibility that compensation is performed with reference to the pixel value of a defective pixel, with the result that it becomes difficult for the compensation to be performed accurately. In this embodiment of the present disclosure, if the moving distance of a figure for the figure to be brought into focus is large, the compensation of a defective pixel is performed with the use of the pixel values of pixels far away from the position of the defective pixel, with the result that, even if there is an image area where plural defective pixels gather together, accurate compensation can be performed. In other words, because an image pickup device with plural defective pixels can be used in the image pickup apparatus according to this embodiment of the present disclosure, the yield of the image pickup device at its manufacturing process can be improved.

Although the compensation according to this embodiment of the present disclosure has been described with the use of G pixels, the similar compensation can be performed with the use of R pixels or B pixels. In addition, luminance signals (Y signals) created from G pixels, R pixels and B pixels can be used for the compensation. Furthermore, an out-of-focus distance regarding an object calculated by a existing object recognizing algorithm can be used for the compensation.

Although a distance between an edge represented by the pixel value of the relevant image creating pixel and an edge represented by the pixel value of a phase difference detection pixel that is a counterpart of the defective pixel is calculated in this embodiment of the present disclosure, this method is not only a method applicable to the present disclosure, but also other methods can be used for the present disclosure. For example, a method in which, after a distance between the position of a defective pixel and the position of an edge represented by the pixel values of the relevant image creating pixels is calculated, whether there is an edge represented by the pixel value of a phase difference detection pixel that is a counter part of the defective pixel is examined, can be used for the present disclosure just like the above-described method.

Although it has been assumed that a moving distance of a figure is an integral multiple of the length of a pixel in this embodiment of the present disclosure, it is conceivable that the moving distance of the figure is not an integral multiple of the length of the pixel (for example, the figure is moved one and a half length of the pixel in the right direction). In this case, a pixel value at the position one and a half length of a pixel left from the original position of the figure is created by linear-interpolating using the pixel value at the position two length of a pixel left from the original position of the figure and the pixel value of at the position one length of a pixel left from the original position of the figure, and this created pixel value can be used for the compensation of the pixel value of the relevant defective pixel.

Although the above descriptions have been made under the assumption that defective pixels belong to one type of a pair of two types of phase difference detection pixels in this embodiment of the present disclosure, the present disclosure is not limited to the above assumption. Even in the case where plural defective pixels belong to both types of a pair of phase difference detection pixels of two types, compensation of the pixel value of each defective pixel can be performed by calculating a luminance value of a phase difference detection pixel that is a counterpart of each defective pixel as the pixel value of the counterpart just like this embodiment of the present disclosure.

In addition, although the descriptions has been made under the assumption that a color filter installed on an image creating pixel is one of three primary color filters (a red filter, a green filter, and a blue filter) in this embodiment of the present disclosure, the present disclosure is not limited to the above assumption. For example, even in the case where a complementary color filter is installed on an image creating pixel, the compensation of the pixel values of the defective pixels can be performed as well. In addition, even in the case where an image creating pixel that detects all kinds of lights belonging to visible wavelengths is situated in an image area (for example, a image pickup device on which a blue pixel, a green pixel, and a red pixel are piled up along an optical axis), the compensation of the pixel values of the defective pixels can be performed just like this embodiment of the present disclosure.

In addition, in this embodiment of the present disclosure, although the descriptions have been made under the assumption that a phase difference detection receives one half of lights obtained by pupil-dividing incoming light, the present disclosure is not limited to the above assumption. For example, even in the case where a phase difference detection pixel equipped with two light-sensitive elements that is capable of receiving both pupil-divided lights with the two light-sensitive elements is situated in an image area, the compensation of the pixel values of the defective pixels can be performed just like this embodiment of the present disclosure.

In addition, in this embodiment of the present disclosure, although the descriptions have been made under the assumption that there are two types of phase difference detection pixels that pupil-divide light in the left and right directions, the present disclosure is not limited to the above assumption. Even in the case where a phase difference detection pixel pupil-divides light in the upward and downward directions, the compensation of the pixel values of the defective pixels can be performed just like this embodiment of the present disclosure. In addition, the present disclosure is not limited to the pattern of the pixel array shown in FIG. 2, and any pattern of a pixel array can be used for the compensation of the pixel values of the defective pixels just like this embodiment of the present disclosure as long as the pattern of the pixel array allows phase difference detection to be performed.

In the above descriptions of this embodiment of the present disclosure, an example of an embodiment of the present disclosure has been explained for the purpose to bring the present disclosure into shape, and as clearly described, some items described in this embodiment of the present disclosure have relationships with specific inventive items in the following claims. In a similar way, each of the specific inventive items in the following claims has a relationship with an item in this embodiment of the present disclosure that has the same name as each of the specific inventive items. However, the present disclosure is not limited to the embodiment described above, but various modifications may be made to the above described embodiment without departing from the spirit and scope of the present disclosure in order to bring the present disclosure into shape.

The processing procedures that have been described in this embodiment of the present disclosure can be brought into shape as a method including a series of such procedures, and this series of procedures can be materialized as a program that causes a computer to perform this series of procedures. The program can be stored on a recording medium. As this recording medium, a CD (compact disc), an MD (minidisc), a DVD (digital versatile disk), a memory card, a blue-ray disc (Blu-ray Disc (registered mark)), or the like can be used.

The present disclosure contains subject matter related to that disclosed in Japanese Priority Patent Application JP 2011-002666 filed in the Japan Patent Office on Jan. 11, 2011, the entire contents of which are hereby incorporated by reference.

What is claimed is:

1. An image processing apparatus comprising:
an image pickup device that is equipped with a plurality of image creating pixels that create pixel values for creating images and equipped with a plurality of pairs of phase difference detection pixels of a first type and a second type that create pixel values for making an in-focus state judgment through phase difference detection;
a detection unit that detects a first edge in a first distribution data formed by the pixel values of the image creating pixels among pixel values included in image data created by the image pickup device and detects a second edge in a second distribution data and a third edge in a third distribution data, wherein the second distribution data and the third distribution data are formed by the pixel values of the phase difference detection pixels of the first type and the second type, respectively; and
a compensation unit that, in a case where a defective pixel is among the phase difference detection pixels of the first type, calculates a distance between the detected third edge regarding the pixel values of phase difference detection pixels of the second type and the detected first edge regarding the pixel values of the image creating pixels, and compensates for a pixel value of the defective pixel on the basis of the calculated distance and the pixel values of the phase difference detection pixels of the second type.

2. The image processing apparatus according to claim 1, wherein
the detection unit sets a certain area used for detecting the distance and detects the third edge represented by the third distribution data of the pixel values of the phase difference detection pixels of the second type within the certain area and the first edge represented by the first distribution data of the pixel values of the image creating pixels adjacent to the certain area, and
the compensation unit calculates a distance between the detected third edge represented by the third distribution data of the pixel values of the phase difference detection pixels of the second type and the detected first edge represented by the first distribution data of the pixel values of the image creating pixels and compensates for the pixel value of the defective pixel on the basis of the calculated distance and the pixel values of the phase difference detection pixels of the second type.

3. The image processing apparatus according to claim 2, wherein the compensation unit compensates for the pixel value of the defective pixel on the basis of the pixel values for the detected third edge represented by the third distribution data of the pixel values of the phase difference detection pixels of the second type if the position of the defective pixel and the position of the detected third edge represented by the third distribution data of the pixel values of the phase difference detection pixels of the second type are situated symmetrically with respect to the position of the detected first edge represented by the first distribution data of the pixel values of the image creating pixels.

4. The image processing apparatus according to claim 3, wherein the compensation unit compensates for the pixel value of the defective pixel on the basis of an average value of the pixel values of the phase difference detection pixels of the first type adjacent to the defective pixel if the position of the defective pixel and the position of the detected third edge represented by the third distribution data of the pixel values of the phase difference detection pixels of the second type are not situated symmetrically.

5. The image processing apparatus according to claim 3, wherein the compensation unit compensates for the pixel value of the defective pixel on the basis of an average value of the pixel values of the phase difference detection pixels of the first type adjacent to the defective pixel if the detected third edge represented by the third distribution data of the pixel values of the phase difference detection pixels of the second type, that corresponds to the detected first edge represented by the first distribution data of the pixel values of the image creating pixels, is not detected in the certain area.

6. The image processing apparatus according to claim 1, wherein the image creating pixels comprises:
red pixels covered with red filters that block light belonging to wavelength ranges other than the wavelength range of red light;
blue pixels covered with blue filters that block light belonging to wavelength ranges other than the wavelength range of blue light, and green pixels covered with green filters that block light belonging to wavelength ranges other than the wavelength range of green light; and wherein the detected first edge represented by the first distribution data of the pixel values of the image creating pixels is a fourth edge of a fourth distribution data formed by the pixel values of the green pixels; and the compensation unit calculates a distance between the detected third edge represented by the third distribution data of the pixel values of the phase difference detection pixels of the second type and the fourth edge represented by the fourth distribution data of the pixel values of the green pixels, and compensates for the pixel value of the defective pixel on the basis of the calculated distance and the pixel values of the phase difference detection pixels of the second type.

7. The image processing apparatus according to claim 1, wherein the compensation unit, in a case where the defective pixel is among the phase difference detection pixels of the second type, calculates a distance between the detected second edge regarding the pixel values of phase difference detection pixels of the first type and the detected first edge regarding the pixel values of the image creating pixels, and compensates for the pixel value of the defective pixel on the basis of the calculated distance and the pixel values of the phase difference detection pixels of the first type.

8. An image pickup apparatus comprising:

an image pickup device that is equipped with a plurality of image creating pixels that create pixel values for creating images and that is equipped with a plurality of pairs of phase difference detection pixels of a first type and a second type that create pixel values for making an in-focus state judgment through phase difference detection;

a detection unit that detects a first edge in a first distribution data formed by the pixel values of the image creating pixels among pixel values included in image data created by the image pickup device and detects a second edge in a second distribution data and a third edge in a third distribution data, wherein the second distribution data and the third distribution data are formed by the pixel values of the phase difference detection pixels of the first type and the second type respectively among the pixel values included in the image data created by the image pickup device;

a compensation unit that, in a case where a defective pixel is among the phase difference detection pixels of the first type, calculates a distance between the detected third edge regarding the pixel values of phase difference detection pixels of the second type and the detected first edge regarding the pixel values of the image creating pixels, and compensates for a pixel value of the defective pixel on the basis of the calculated distance and the pixel values of the phase difference detection pixels of the second type;

a judgment unit that judges whether a focus-target object is actually brought into focus or not on the basis of the compensated pixel value of the defective pixel; and a control unit that controls the drive of a lens on the basis of a judgment result made by the judgment unit.

9. An image processing method comprising:

causing an image pickup device, which is equipped with a plurality of image creating pixels and a plurality of pairs of phase difference detection pixels of a first type and a second type respectively, to create pixel values for creating images with the use of the plurality of the image creating pixels, and to create pixel values for making an in-focus state judgment through phase difference detection with the use of the plurality of pairs of phase difference detection pixels of the first type and the second type respectively;

detecting a first edge in a first distribution data formed by the pixel values of the image creating pixels among pixel values included in image data created by the image pickup device and a second edge in a second distribution data and a third edge in a third distribution data, wherein the second distribution data and the third distribution data are formed by the pixel values of the phase difference detection image pixels of the first type and the second type respectively among the pixel values included in the image data created by the image pickup device; and calculating, in a case where a defective pixel is among the phase difference detection pixels of the first type, a distance between the detected third edge regarding the pixel values of phase difference detection pixels of the second type and the detected first edge regarding the pixel values of the image creating pixels; and compensating a pixel value of the defective pixel on the basis of the calculated distance and the pixel values of the phase difference detection pixels of the second type.

10. A non-transitory computer readable medium having stored thereon, a computer program having at least one code section executable by a computer, thereby causing the computer to perform the steps comprising:

causing an image pickup device, which is equipped with a plurality of image creating pixels and a plurality of pairs of phase difference detection pixels of a first type and a second type respectively, to create pixel values for creating images with the use of the plurality of the image creating pixels, and to create pixel values for making an in-focus state judgment through phase difference detection with the use of the plurality of pairs of phase difference detection pixels of the first type and the second type respectively;

detecting a first edge in a first distribution data formed by the pixel values of the image creating pixels among pixel values included in image data created by the image pickup device and a second edge in a second distribution data and a third edge in a third distribution data, wherein the second distribution data and the third distribution data are formed by the pixel values of the phase difference detection image pixels of the first type and the second type respectively among the pixel values included in the image data created by the image pickup device; and calculating, in a case where a defective pixel is among the phase difference detection pixels of the first type, a distance between the detected third edge regarding the pixel values of phase difference detection pixels of the second type and the detected first edge regarding the pixel values of the image creating pixels; and compensating a pixel value of the defective pixel on the basis of the calculated distance and the pixel values of the phase difference detection pixels of the second type.

* * * * *